United States Patent Office 3,845,231
Patented Oct. 29, 1974

3,845,231
PROCESS FOR PREPARING A CANNED PRESSURIZED CARBONATED SHERBET-MIX PACKAGE
Taro Nagasawa, Taizo Ryoki, Isao Kiyosawa, Saburo Oizumi, and Yasuo Fukuwatari, Tokyo, Takashi Suzuki, Chiba, Hitoshi Ishibashi, Kawasaki, and Nobuo Kawamura, Tokyo, Japan, assignors to Moringa Milk Co., Ltd.
Continuation-in-part of applications Ser. No. 855,031, Sept. 3, 1969, now abandoned, and Ser. No. 167,579, July 30, 1971, now Patent No. 3,761,285. This application June 23, 1972, Ser. No. 265,691
Claims priority, application Japan, June 30, 1971, 46/47,258
Int. Cl. A23g 5/00; A23l 3/36; B65b 55/00
U.S. Cl. 426—393                10 Claims

ABSTRACT OF THE DISCLOSURE

Preparing a canned pressurized carbonated sherbet-mix package by forming a syrupy liquid containing sugar as a main component with friut juice, organic acid, milk, milk product and/or flavoring, so that the total solid content is 10 to 20% and separately preparing a gum mix of locust bean gum or guar gum and an aqueous solution containing carrageenan; pasteurizing, then cooling the two mixes; partially filling a can with the syrupy mix; dissolving carbon dioxide in the gum mix so that the pressure is about 1.0 to 2.3 kg./cm.$^2$ at 15° C.; filling the can in which the syrupy mix A has been previously placed with the gum mix, sealing, warming and shaking the canned mixture of the two mixes to make the content homogenous, whereby when the canned sherbet-mix package is frozen and opened under ambient conditions, the frozen content sprouts out and rises in a form of column to produce a sherbet of smooth foamy structure having 1.6 to 1.8 times the volume.

CROSS REFERENCES TO RELATED APPLICATIONS

This is a continuation-in-part application to U.S. patent application Ser. No. 855,031 filed Sept. 3, 1969, now abandoned, entitled to the convention priority of the corresponding Japanese patent application 10496/1969, filed Feb. 14, 1969 and to U.S. continuation-in-part application thereof Ser. No. 167,579 filed July 30, 1971, now U.S. Pat. No. 3,761,285, issued Sept. 25, 1973 and the filing dates thereof are claimed for this case for all common subject matters.

BACKGROUND OF THE INVENTION

Field of the invention

A canned carbonated mix package and process therefor.

DESCRIPTION OF THE PRIOR ART

The prior art is represented by U.S. Pat. Nos. 1,548,-430 of Aug. 4, 1925, to F. M. Ashley; 2,290,214 of July 21, 1942 to C. M. Smith, Jr.; and French Pat. No. 1,539,-120 of August 1968 to Weinstein.

Some of these references broadly teach the employment of a propellant gas in a sherbet of undefined proportions, pressures and temperatures for the sole purpose of expelling the sherbet in an amorphous heap as an intermediate step to a subsequent processing or serving thereof.

SUMMARY OF THE INVENTION

The present invention relates to an improved process for manufacturing a canned pressurized carbonated sherbet-mix package from which, when it is frozen, the sherbet-mix sprouts out and rises slowly in a form of a column to produce a carbonated sherbet having a smooth structure of fine ice crystals and carbonic acid flavor when said package is frozen as it is pressurized and is opened under atmospheric pressure.

More particularly, the present invention relates to an improvement in the process of the above prior application for manufacturing a canned pressurized carbonated sherbet-mix package, which is characterized by adding a stabilizer to a liquid sherbet mix containing sugar, organic acid, a milk product, fruit juice, flavoring, and/or extracts from medicinal herbs, etc. after it has been pasteurized, cooling the liquid, injecting and dissolving carbon dioxide into the liquid so that the pressure becomes above 1.3 kg./cm.$^2$ (gauge pressure) at 15°, placing the liquid in a container and sealing it.

When the package manufactured as described above is stored in a freezer to freeze its content completely and opened at room temperature under atmospheric pressure, a sherbet having a smooth texture containing fine ice crystals with carbonic acid flavor and a comfortable cool sensation sprouts out and rises slowly in a form of a column, by expansion and diffusion of carbon dioxide and expands to 1.6 to 1.8 times the volume of the raw material liquid.

The formation of the carbonated sherbet in the present invention and the prior application process is based on a principle that, when the canned pressurized carbonated sherbet-mix package is opened and the pressure is reduced, carbon dioxide is expanded and diffused in the frozen sherbet-mix. Therefore, in order to obtain the desired sherbet, it is an indispensable requirement that the above described package is in such a state that its content, i.e. sherbet-mix is frozen under a certain pressure of carbon dioxide.

The lower the temperature is, the higher is the solubility of carbon dioxide. The solubility of carbon dioxide increases in proportion to pressure, and conversely the higher the concentration is of the solid content, the lower is the solubility of carbon dioxide. In the course of freezing the contents, the impregnated carbon dioxide tends to supersaturate as at lower temperature, the ice prevents concentration of the solutes in the unfrozen phase, and eventually part of the gas vaporizes in bubbles. The pressure of the carbon dioxide thus compressed within the can reaches to several times that at room temperature, i.e. 6 to 7 kg./cm.$^2$. Next, when the can is opened and the content is exposed to atmospheric pressure, carbon dioxide in the compressed state vaporizes and expands, and the contents are slowly pushed up from the opening of the can by the expansion of the carbon dioxide, to form a column of a sherbet of smooth foamy structure containing fine ice crystals and having a carbonic acid flavor, expanded to 1.6 to 1.8 times the volume of the original mix.

In contrast, upon freezing the conventional canned carbonated beverage as it is in a container, such effect cannot be obtained but only a hard water ice block of rough crystals is obtained. Also, an aerosol product is known as a package capable of forming a foamy product similar to that in the above described invention. However, when the content in the aerosol product passes under high pressure (5 to 7 kg./cm.$^2$) through a fine orifice, gas expands to yield a certain overrun and, therefore, an expensive container provided with a valve and a special manufacturing apparatus are required for pressurizing the content. In an attempt to make an ice cream- or sherbet-like product from an aerosol product, first a foam must be dispensed from the aerosol container only subsequently to be frozen, because, if the content would be frozen directly in the aerosol container, it could not pass through its orifice. Also, in accordance with the present invention, the pressure applied to the product can be lower than that required of the aerosol product.

Thus, the sherbet manufacture from the package of the present invention does not require the product mechanism for the frozen foamy aerosol product. An instant mix for making an ice dessert also has been on market. It is, however, not easy to prepare an ice dessert such as ice cream and sherbet using such an instant mix at home or in a shop because it is complicated in operation and requires a special apparatus. However, the canned pressurized carbonated sherbet-mix package according to the present invention offers a delicious sherbet equal to the one commercially available, when the package is frozen in a freezer and opened. In addition it shows an interesting phenomenon in that the contents sprout and rise slowly.

The sherbet of the present invention has a foamy structure composed of fine ice crystals. For obtaining the foamy product by expansion and diffusion of gas it is required that the ice crystals are fine and gas is uniformly dispersed and expanded. In the method of the prior application, a natural gum substance or synthetic stabilizer is used as a stabilizer. However, in such case, when freezing a pressurized package and opening it, the content tends to separate a dense foam from the structure of the sherbet at the time of sprouting out and rising.

An object of the present invention is to improve the performance of the product described in the prior parent applications and to provide an improved process for preparing a canned pressurized carbonated sherbet-mix package capable of giving a sherbet having a fine structure of ice crystals and of expanding uniformly at the time of opening the package. By using a stabilizer as an important factor for obtaining a uniform rising of a fine and smooth sherbet product and by the selection of the kind and amount of the stabilizer to be used and the manner of its use, the present inventors have accomplished a practical manufacturing process for preparing a canned pressurized carbonated sherbet-mix package characterized by preparing a syrup (liquid A) containing sugar as a main component, and fruit juices, organic acids, a milk product and/or flavorings so that the total solid content is 10 to 20% and containing 0.05 to 0.20% of locust bean gum or guar gum and an aqueous solution (liquid B) containing 0.02 to 0.1% of carrageenan, after pasteurizing and then cooling the both liquids A and B, partially filling a can with the liquid A, dissolving carbon dioxide in the liquid B so that the pressure is 1.0 to 2.3 kg./cm.$^2$ at 15° C. and filling up the can with the liquid B in which the liquid A has been previously placed and, after sealing said can, warming and shaking said can to make the content homogeneous.

DETAILED EXPLANATION OF THE PREFERRED EMBODIMENT

Figures 1, 2, 3:
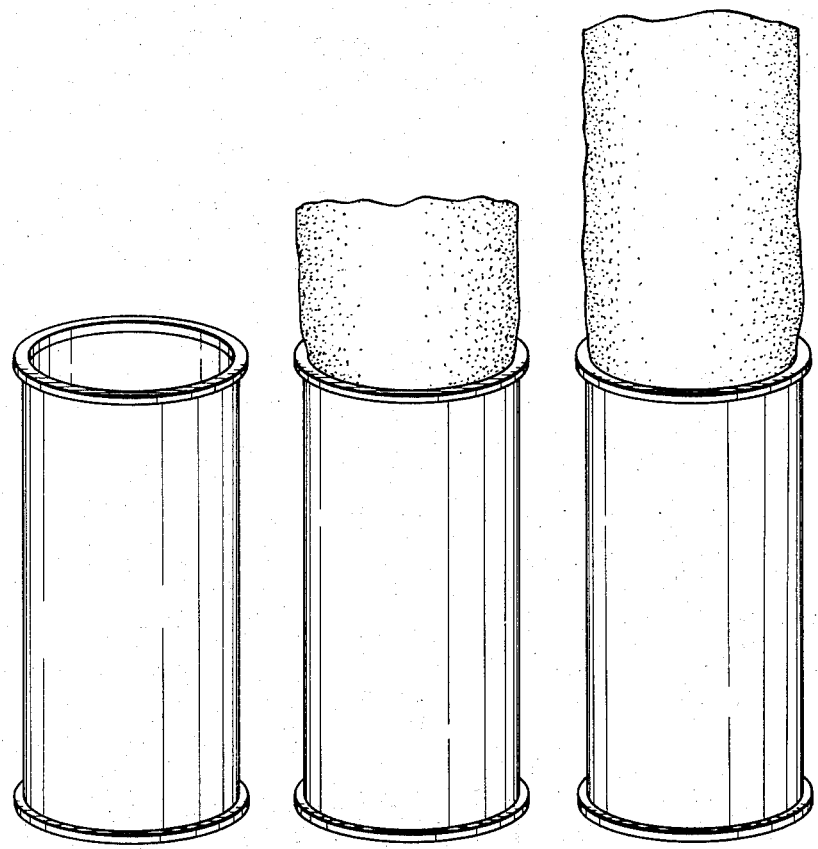
FIG. 1 shows in perspective the canned pressurized carbonated sherbet-mix package of the present invention in frozen state.
FIGS. 2 and 3 show in two sequential stages the state of the sherbet after the package is opened and its content rises in a form of column.

The conditions for manufacturing such interesting canned pressurized carbonated sherbet-mix package of the present invention include the composition of the mix, in particular the kind and amount of ingredients, the kind and amount of stabilizer to be added, the pressure of carbon doxide in a container and the container used, etc.

Accordingly the order of manufacturing steps in the process of the present invention are as follows:

First, two liquid mixes A and B are prepared independently of each other. The liquid A is a syrup prepared by adding 0.05% to 0.20%, based on the final total solids content, of locust bean gum or guar gum to a raw material liquid containing sugar such as sucrose, glucose, etc. as a main component, citric acid, malic acid, etc. as an organic acid; orange juice, strawberry juice, etc. as fruit juice, or a dairy product such as condensed milk, skim milk, whey powder, etc.; spice; an artificial sweetener, flavoring extract such as coffee, etc., and an extract such as comfrey (Borraginaceae), kuko (Lycium chinense Mill), etc. They provide a total content of solids between about 10 and 20%, the sugar being the main component of the mix. If the total solid content is over 20%, the solubility of carbon dioxide is reduced, thereby the expansion of the sherbet obtained decreases and, in addition, when the final mix is frozen, the solids concentration of the unfrozen part becomes too high so that the frozen part and the unfrozen part are not uniform and the rising of sherbet becomes uneven and limited. If the total solids content is less than 10%, the formation of ice crystals increases and, therefore, the formation of a fine foamy texture becomes difficult.

The liquid B is prepared by dissolving carrageenan at a ratio between 0.02 and 0.1%, for the total amount of liquids A and B in water. Both liquids A and B are separately pasteurized and cooled according to conventional methods. When the liquid contains dairy products, the liquid is homogenized before pasteurization, if necessary. Carbon dioxide is introduced into the cooled liquid B to be dissolved therein. It is advantageous for dissolution of carbon dioxide and necessary for sealing a can to keep the liquid B at a low temperature. In order to keep the ice crystals discrete, carbon dioxide substantially of 100% purity is employed.

In addition to the above described function, carbon dioxide provides the sherbet with carbonic acid flavor. Carbon dioxide is pressurized and dissolved into a sherbet-mix from a carbon dioxide storage pressure tank or liquid carbon dioxide storage tank so that the canned product has 1.0 to 2.3 kg./cm.$^2$ of inner pressure at 15° C. A conventional carbonator is desirably employed for dissolution of carbon dioxide. The foaming of sherbet varies with the amount of dissolved carbon dioxide, by filling up with pressure. A pressure within the range as described above is necessary for obtaining the effect of the present invention. When the amount of dissolved gas is small only a small amount of foamy texure is produced and, therefore, the desired amount of rising sherbet cannot be expected at the time of opening a package. The filling pressure of carbon dioxide must be at least 1.0 kg./cm.$^2$ In the present invention, although the inner pressure of the can is as low as 1.0 to 2.3 kg./cm.$^2$ in comparison with that of an aerosol product, since the pressurized can is frozen as it is, the inner pressure after the completion of freezing is elevated to 6 to 7 kg./cm.$^2$. The elevation of pressure serves to effectively raise the frozen contents upon opening of the can.

When the total solid content of sherbet-mix increases the filling up pressure must be elevated since the amount of carbon dioxide dissolved decreases, and, accordingly, a can withstanding higher pressure would be required. Thus it is not economical to increase the total solids content. It is sufficient if the total solids content is 20% maximum and the pressure is 2.3 kg./cm.$^2$ at 15° C. maximum.

In general, the amount of carbon dioxide necessary for producing a foamy texture is such an amount as is obtained in case the carbonated sherbet product is filled under pressure so as to be 1.0 to 2.3 kg./cm.$^2$ at 15° C., since a sherbet having at least 50% of overrun is desirable as an ice dessert.

In order to cause a phenomenon such that, when the canned pressurized carbonated sherbet-mix package is frozen under pressure and is opened under atmospheric pressure, an expanded contents sprout out and rise slowly in a form of a column to produce a smooth texture of carbonated sherbet, the mix solution should have the following properties:

(1) The solution undergoes a certain duration of supercooling status in the freezing process in which no ice crystal is observed even below the freezing point; and
(2) The solution reveals a structure containing fine ice crystals, after the completion of freezing, through which carbon dioxide is able to expand and diffuse uniformly.

In other words, for causing the above mentioned phenomenon it is necessary to give the solution a super cooling property and also give the fine ice crystals produced by freezing a discontinuous texture phase.

Use and selection of stabilizer are determined by the viscosity, freezing point, and solid concentration of the mix and are extremely important to yield the above described properties in the mix. Although natural gum, synthetic stabilizer, and other natural thickening agents are usually used as stabilizers, in the present invention a combination of carrageenan and locust bean gum or guar gum is used as the stabilizer for the mix. In addition to locust bean gum or guar gum, other gums having the same properties can be used in the same combination. Except carrageenan, natural gum and synthetic stabilizer, when used alone, are not preferably used as a stabilizer, since their use causes a foaming liquid to separate at the time of rising of the sherbet and the texture becomes viscous. However, the rising by itself is good. With the single use of carrageenan or a combination of carrageenan and any viscosity increasing agent other than gums, a structure containing ice crystals in which carbon dioxide can uniformly expand is difficult to form and a good quality of rising sherbet cannot be obtained.

In order to obtain a discontinuous phase of ice crystal texture, the sherbet mix viscosity is preferably more than about 10 CP. at 10° C. In case the viscosity is below 10 CP. at 10° C., the rise of the frozen contents is remarkably decreased. The minimum amount of stabilizer used is 0.02% of carrageenan and 0.05% of locust bean gum or guar gum. With concentration of above 0.10% of carrageenan and above 0.20% of locust bean gum or guar gum, the structure of the ice crystals becomes plate-like because the mix does not experience a supercooling status in the freezing process. Any other stabilizer can be additionally used for the above described combination of stabilizers, for example, addition of propylene glycol alginate or methyl cellulose in an amount of 0.02 to 0.06% is extremely effective for obtaining the desired sherbet with a lower pressure (1.0 to 1.3 kg./cm.$^2$ at 15° C.) of carbon dioxide.

When mixing carrageenan and locust bean gum or guar gum, the viscosity of the mix at a low temperature is extremely increased in comparison with using one of them alone because of their synergistic action. Therefore, for example, when carbon dioxide is dissolved in a mix under high pressure by means of a carbonator, it is very difficult to fill said mix into a can because of the vigorous foaming of carbon dioxide. Such difficulty is solved by using the following method according to the present invention. For example, in case of using a combination of carrageenan and locust bean gum, the latter is dissolved in a raw material-containing syrup liquid to make liquid A and, on the other hand, carrageenan is dissolved in water to prepare liquid B. The both liquids are separately pasteurized and cooled. Immediately thereafter liquid A is partially poured into a can. Carbon dioxide is dissolved into liquid B under pressure and the liquid is placed into the can containing liquid A. The can, after mixing liquid A and liquid B is sealed and warmed, and thereafter rotated on a belt conveyor to mix the contents homogeneously. Incidentally, a small amount of locust bean gum or guar gum may be added to liquid B.

By the above mentioned operation, difficulties encountered on manufacturing technique in the process of the prior application can be overcome and the desired canned pressurized carbonated sherbet-mix package can be prepared, and the sherbet produced has a uniform rising and a smooth foamy structure containing tiny ice crystals.

The canned package thus manufactured according to the present invention is completely frozen in a freezer. The freezing temperature is desirably −10 to −25° C. If freezing of the present product is at a temperature of above −10° C., the formation of ice will not be sufficient, and the carbonated sherbet of desired rigidity would be difficult to rise up from the can. If freezing of the product is at a temperature of below −25° C., a duration of supercooling is difficult to be kept and the ice crystallizes to a large plate-like, thus a good texture of sherbet cannot be obtained.

The can used in the present invention is a common can such as is used for beer or carbonated beverage. The can has to resist pressure of at least 6.5 kg./cm.$^2$ and should not be such a can as an aerosol container having a special valve. When opening the frozen can by means of a common can-opener under atmospheric pressure, the frozen contents sprout out and rise slowly in a form of column to a sherbet owing to the expansion of carbon dioxide. A sherbet in such a state cannot be obtained in such a way by expanding carbon dioxide through an orifice of valve. Therefore, a valve is not only unnecessary for the can used in the present invention but also makes it impossible to take out the frozen content.

EXAMPLE 1

(1) Preparation of syrup liquid A 5 kg. of sucrose, 0.25 kg. of locust beam gum and 0.10 kg. of methyl cellulose were mixed in powder form and thereafter were dissolved in 18.15 kg. of water and then 36 kg. of sucrose, 40 kg. of orange juice and 0.5 kg. of orange flavoring material (containing coloring matter) were added thereto to prepare 83 l. (100 kg.) of syrup liquid A. After pasteurizing by a tubular heater at 85° C. for 5 minutes and then cooling to 20° C., 83 ml. (100 g.) of liquid A was partially filled into a can by means of a filler.

(2) Prepartion of carbonated liquid i.e. liquid B 5 kg. of sucrose and 0.20 kg. of carrangeenan were mixed in powder and were dissolved in water to prepare 167 l. of a liquid, which were then pasturized by a pasteurizer at 90° C. for 5 seconds and cooled to below 5° C., and thereafter carbon dioxide was dissolved therein by means of a carbonater of 2.5 kg./cm.$^2$ in inner pressure to prepare liquid B.

(3) Mixing liquid A and liquid B 167 ml. of liquid B were poured into a can filled with 83 ml. (100 g.) of liquid A by means of another filler to 250 ml. in content, and thereafter the can was sealed. The can was warmed to about 40° C., by means of a can-warmer and rotated on a conveyor to mix liquid A and liquid B.

Composition of content:
Degree of sucrose _____ 18° BX
Carrageenan _____ 0.08% W/V
Locust bean gum _____ 0.10% W/V
Methyl cellulose _____ 0.04% W/V
Inner pressure of can _____ 1.3 kg./cm.$^2$ at 15° C.

Next, when the canned pressurized carbonated sherbet-mix package so prepared was stored in a freezer to be frozen and then was opened, the content sprouted out and rose in the form of a column to 1.8 times the height of the can to give a sherbet of fine ice crystals having carbonic acid flavor.

EXAMPLE 2

5 kg. of sucrose, 0.25 kg. of guar gum and 0.10 kg. of PGA (propylene glycol alginate) were mixed in powder form and were dissolved in 16.65 kg. of water and 20 kg.

of sucrose, 17.5 kg. of sorbitol (powder), 40 kg. of strawberry juice and 0.5 kg. of strawberry flavoring material (containing coloring matter) were added thereto to prepare 83 l. (100 kg.) of syrup (liquid A). Further the same operation as in Example 1 was run to obtain a canned pressurized carbonated sherbet-mix package.

Composition of content:
- Degree of sucrose _____ 18.8° BX
- Carrageenan _____ 0.08% W/V
- Guar gum _____ 0.10% W/V
- PGA _____ 0.04% W/V Inner pressure of can _____ 1.3 kg./cm.$^2$ at 15° C.

When the above canned package was frozen and opened under atmospheric pressure, the content sprouted out and rose in the form of a column to give a good quality of sherbet comprising fine ice crystals and having carbonic acid flavor.

EXAMPLE 3

5 kg. of sucrose, 0.15 kg. of locust bean gum, 0.10 kg. of guar gum and 0.10 kg. of methyl cellulose were mixed in powder form and were dissolved in 41.15 kg. of water, and then 23 kg. of sucrose, 30 kg. of melon juice (degree of sucrose 40° BX), 0.10 kg. of citric acid and 0.4 kg. of melon flavoring material (containing coloring matter) were added thereto to prepare 83 l. (100 kg.) of syrup (liquid A). Further the same operation as in Example 1 except the pressure of carbonator was 2.2 kg./cm.$^2$ was run to obtain a canned pressurized carbonated sherbet-mix package.

Composition of content:
- Degree of sucrose _____ 16.5° BX
- Carrageenan _____ 0.08% W/V
- Locust bean gum _____ 0.06% W/V
- Guar gum _____ 0.04% W/V
- Methyl cellulose _____ 0.04% W/V Inner presure of can _____ 1.0 kg./cm.$^2$ at 15° C.

When the above package was frozen and then opened under atmospheric presure the content sprouted out and rose in a form of a column to give a good quality of sherbet comprising fine ice crystals and have carbonic acid flavor.

What is claimed is:

1. A process for preparing a pressurized carbonated sherbet-mix package in a can for producing a carbonated sherbet having a rigid foamy structure of fine ice crystals, comprising the steps of:

preparing a syrupy mix containing as its main component sugar with additives selected from the group consisting of fruit juices, organic acids, milk products and flavorings;
   said syrupy mix having a total solids content between about 10% and 20%;
   preparing a gum mix of between about 0.05% and 0.20% total solids content, said gum being selected from the group consisting of locust bean gum and guar gum;
   mixing said gum mix with an aqueous pasteurized solution of between 0.02 to 0.1% of carrageenan;
   pasteurizing and cooling said syrupy mix and partially pre-filling a can therewith;
   pasteurizing and cooling said gum mix and dissolving therein carbon dioxide at a pressure of about 0.1 to 2.3 kg./cm.$^2$ at 15° C.;
   filling the unfilled portion of said can with said gum mix; and
   pressure sealing, warming and homogenizing the contents thereof into a homogenized mixture, whereby when the can is frozen and opened under ambient conditions carbonated sherbet rises therefrom in a column expanded to 1.6 to 1.8 times the volume of said mixture.

2. The process of Claim 1, wherein the syrupy mix contains sucrose.

3. The process of Claim 1, wherein the syrupy mix contains glucose.

4. The process of Claim 1, wherein the organic acids are selected from the group consisting of citric and malic acids.

5. The process of Claim 1, wherein the fruit acids are selected from the group consisting of orange and strawberry juices.

6. The process of Claim 1, wherein the milk products are selected from the group consisting of condensed milk, skim milk, and whey powder.

7. The process of Claim 1, wherein said syrupy mix further comprises one or more members selected from the group consisting of spice, artificial sweetener, coffee, comfrey and kuko.

8. The process of Claim 1, further comprising the step of adding a stabilizer selected from the group consisting of propylene glycol alginate and methyl cellulose.

9. The process of Claim 1, further comprising the step of maintaining the canned package at a freezing temperature between −10° to −25° C.

10. The process of Claim 1, further comprising the step of employing a can able to resist a pressure of at least 6.5 kg./cm.$^2$.

References Cited

UNITED STATES PATENTS

| | | | | |
|---|---|---|---|---|
| 1,548,430 | 8/1925 | Ashley | | 99—136 |
| 2,290,214 | 7/1942 | Smith | | 99—136 |

FOREIGN PATENTS

| | | | | |
|---|---|---|---|---|
| 1,539,120 | 8/1968 | France | | 99—136 |

RAYMOND N. JONES, Primary Examiner

U.S. Cl. X.R.

426—394, 397, 399, 131, 164

UNITED STATES PATENT OFFICE
CERTIFICATE OF CORRECTION

Patent No. 3,845,231　　　　　　　　Dated October 29, 1974

Inventor(s) Taro Nagasawa et al.

It is certified that error appears in the above-identified patent and that said Letters Patent are hereby corrected as shown below:

In the heading to the printed specification, lines 8 and 9, "Moringa Milk Co., Ltd." should read -- Morinaga Milk Industry Co. Ltd. --.

Signed and sealed this 14th day of January 1975.

(SEAL)
Attest:

McCOY M. GIBSON JR.　　　　　　C. MARSHALL DANN
Attesting Officer　　　　　　　Commissioner of Patents